(12) United States Patent
Chau et al.

(10) Patent No.: US 7,676,904 B2
(45) Date of Patent: Mar. 16, 2010

(54) METHOD OF MANUFACTURING HIGH SENSITIVITY SPIN VALVE DESIGNS WITH ION BEAM TREATMENT

(75) Inventors: Phong V. Chau, San Jose, CA (US); James Mac Freitag, Sunnyvale, CA (US); Mustafa Michael Pinarbasi, Morgan Hill, CA (US); Hua Ai Zeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 805 days.

(21) Appl. No.: 10/903,097

(22) Filed: Jul. 30, 2004

(65) Prior Publication Data

US 2006/0023371 A1    Feb. 2, 2006

(51) Int. Cl.
*G11B 5/127*    (2006.01)
*C23C 14/34*    (2006.01)

(52) U.S. Cl. .................. 29/603.12; 29/603.13; 216/22; 216/94; 216/38; 216/66; 360/313; 204/192.11; 204/192.34; 428/811

(58) Field of Classification Search .................. 360/327, 360/327.1, 313, 320, 322; 427/128, 129, 427/130; 204/192.17, 192.2, 192.34, 192.11; 29/603.12, 603.13, 603.17; 216/22, 94, 38, 216/58, 66; 428/811, 811.2
See application file for complete search history.

(56) References Cited

U.S. PATENT DOCUMENTS

| | | | | |
|---|---|---|---|---|
| 4,117,301 A | * | 9/1978 | Goel et al. .......... 204/192.34 X |
| 4,278,493 A | * | 7/1981 | Petvai ................ 204/192.34 |
| 4,662,985 A | * | 5/1987 | Yoshida et al. ............ 216/66 X |
| 4,761,199 A | * | 8/1988 | Sato ..................... 204/192.34 |
| 5,753,131 A | * | 5/1998 | Choukh et al. ................ 216/22 |
| 5,892,641 A | * | 4/1999 | Ishiwata .................. 360/327.1 |
| 6,093,444 A | * | 7/2000 | Miyauchi et al. ............ 427/128 |
| 6,521,098 B1 | * | 2/2003 | Lin et al. ................ 204/192.11 |

OTHER PUBLICATIONS

NN8606312, "Nanostructures for High Resolution Measurements of Magnetic Fields", IBM Technical Disclosure Bulletin, vol. 29, Issue No. 1, pp. 312-314, Jun. 1986.*
Stinnett et al., "Commercial Applications & Equipment for Ion Beam Surface Treatment", Discharges and Electrical Insulation in Vacuum, 2000, Symposium on ISDEIV XIXth International Proceedings, vol. 2, pp. 671-674, Sep. 2000.*
Toyada et al, "Surface Processing by Gas Cluster Ion Beams", Proceedings of the 11th International Conference on Ion Implantation Techology, pp. 16-21, Jun. 1996.*
Adrian J. Devasahayam, Jacques C.S. Kools, Chi-Ching Hu, Ming Mao, Chih-Ling Lee, Wes Skinner, and John Hautala, "Comparison of RF Bias, Gas Cluster Ion Beam and Ion Beam In-Situ Beat Treatment For Enhancement of GMR in Spin Valve Stacks," paper FP-01.

* cited by examiner

*Primary Examiner*—A. Dexter Tugbang
(74) *Attorney, Agent, or Firm*—Zilka-Kotab, PC

(57) ABSTRACT

A method of manufacturing a GMR, TMR or CPP GMR sensor having a smooth interface between magnetic and non-magnetic layers to improve sensor performance by exposing a layer to a low energy ion beam prior to depositing a subsequent layer.

15 Claims, 6 Drawing Sheets

METHOD OF MANUFACTURING HIGH
SENSITIVITY SPIN VALVE DESIGNS WITH
ION BEAM TREATMENT

FIELD OF THE INVENTION

The present invention relates to magnetoresistive sensors and more particularly to a GMR sensor having improved, smooth interlayer interface resulting in improved GMR performance.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. A pinned layer in an AP pinned spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second non-magnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

The ever present demand for increased data rate and data density has lead researchers to continually seek ways to increase the performance of magnetoresistive sensors such as GMR sensors. Improved sensor performance allows disk drives to be constructed with greater track density, greater linear data density and improved signal strength and resolution.

One factor that has limited sensor performance has been imperfect interfaces between the various layers of the sensor, such as at the pinned layer/spacer layer interface and at the spacer layer/free layer interface. Imperfections such as roughness in the layer interfaces results in incoherent electron scattering, which results in a significant decrease in sensor performance. A critical performance parameter of a sensor is dr/R, where dr is the change in resistance in response to the presence of a magnetic field and R is the resistance (sheet resistance) of the sensor. It can therefore be appreciated that any increase in the incoherent scattering at rough interfaces, which negatively affects dr, greatly decreases the performance of the sensor.

Another reason the interface roughness adversely affects sensor performance is that such roughness imperfections affect the thickness of the layers such as the spacer layer. Layers of a GMR sensor are on the order of Angstroms thick. For example, the spacer layer of a typical GMR sensor can be 18 and 24 Angstroms thick. Therefore, a small amount of interface roughness leads to a significant variation in the thickness of a layer as a percentage of the nominal thickness. The roughness of the interface also increases Neel coupling between the ferromagnetic layers, which requires the spacer layer to be made thicker than would otherwise be necessary, resulting in decreased sensor performance.

Therefore, there is a strong felt need for a GMR sensor having increased performance to meet the data density and data rate demands of future data recording systems. More specifically there is a strong felt need for a means for decreasing interface roughness between the various layers of a GMR sensor, in order to increase overall sensor performance.

SUMMARY OF THE INVENTION

The present invention provides a method of manufacturing a magnetoresistive sensor having improved performance by improving the smoothness of the interface between layers of the sensor. A first layer is deposited, and then a low power ion beam is applied to the deposited first layer to smooth the surface thereof. Thereafter a second layer can be deposited on the smooth surface of the first layer.

The low power of the ion beam advantageously allows the ion beam to smooth the surface of the first layer without sputtering (ie. removing material from) the first layer. The ion beam source preferably has an energy of around the sputtering threshold of the material making up the first layer. This sputtering threshold in general is around 50 electron volts (EV) or lower for Co. The low energy ion beam is preferably from an ion beam source capable of extraction voltages of 100 EV or less, and could be from a source capable of extraction voltages as low as 25 EV or even 15 EV.

By smoothing the surface of the interface between the layers, the performance of the sensor is improved in many ways. For example, the smooth interface provides lower interface scattering, which increases dr/R. In addition, the improved smoothness improves provides a consistent and well controlled thickness for critical layers such as the spacer layer. Furthermore, the smooth interface enables reduction of the spacer layer thickness by reducing the Neel coupling between the ferromagnetic layers.

The first layer can be for example Co or CoFe and can be the pinned layer of the sensor. The second layer could then be the spacer layer and could comprise Cu. As another example, the first layer could be the spacer layer, such as Cu, and the second layer could be the free layer, which could be Co or CoFe.

These and other advantages and aspects of the present invention can be better appreciated upon reading of the following detailed description taken in conjunction with the Figures in which like reference numerals designate like elements throughout the various Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
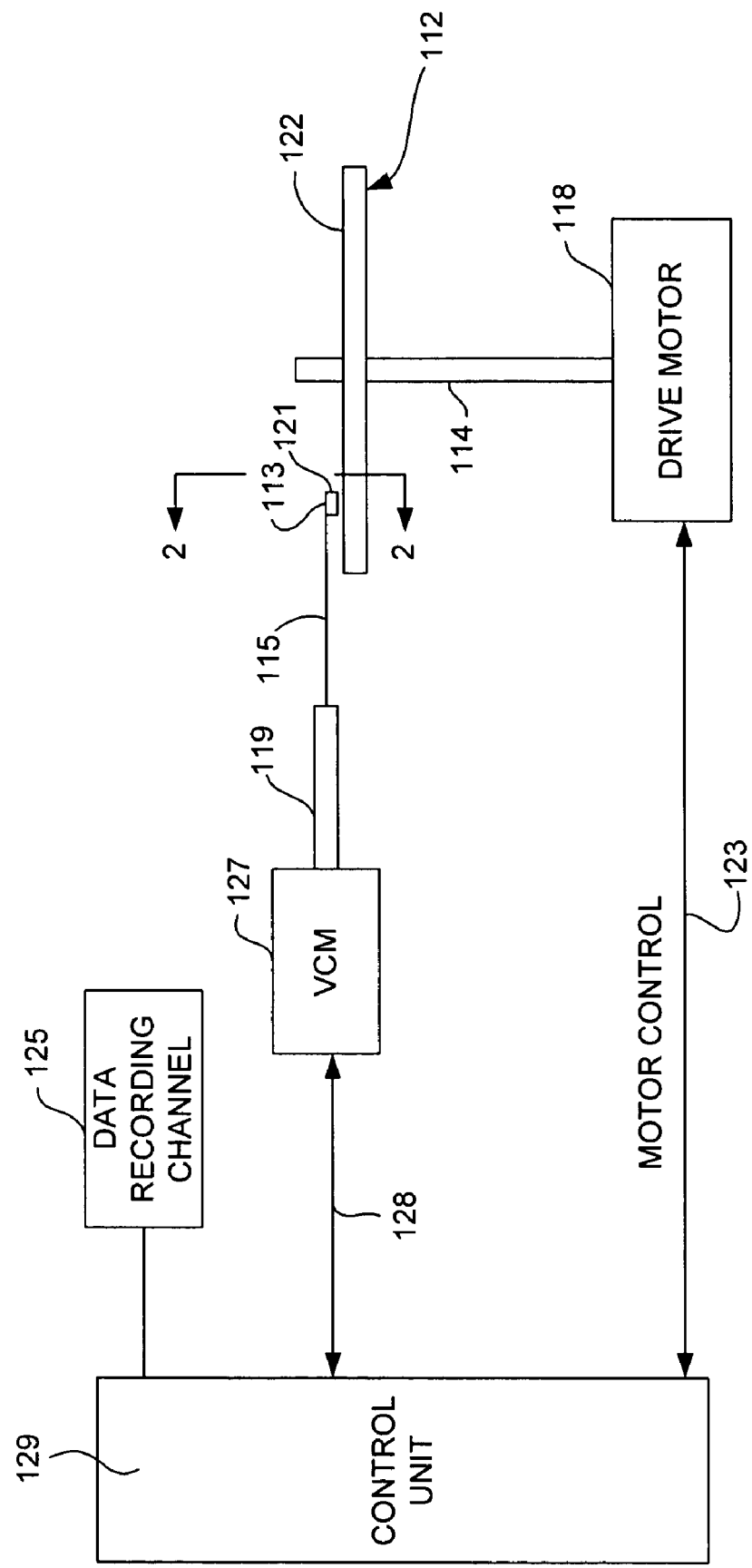
FIG. 1 is a schematic illustration of a disk drive system in which the invention might be embodied.

Referring now to FIG. 1, there is shown a disk drive 100 embodying this invention. As shown in FIG.1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
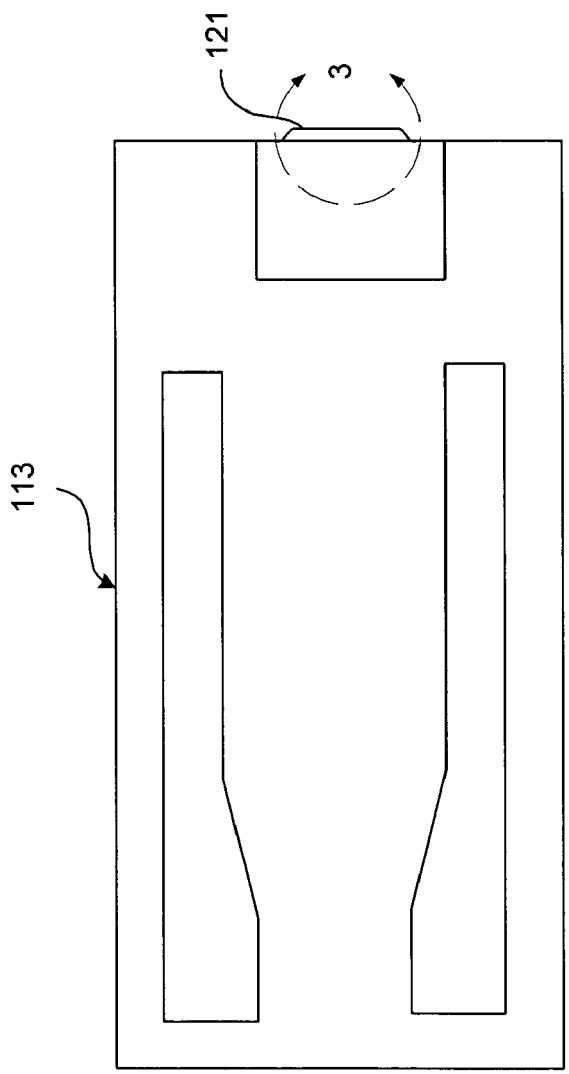
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
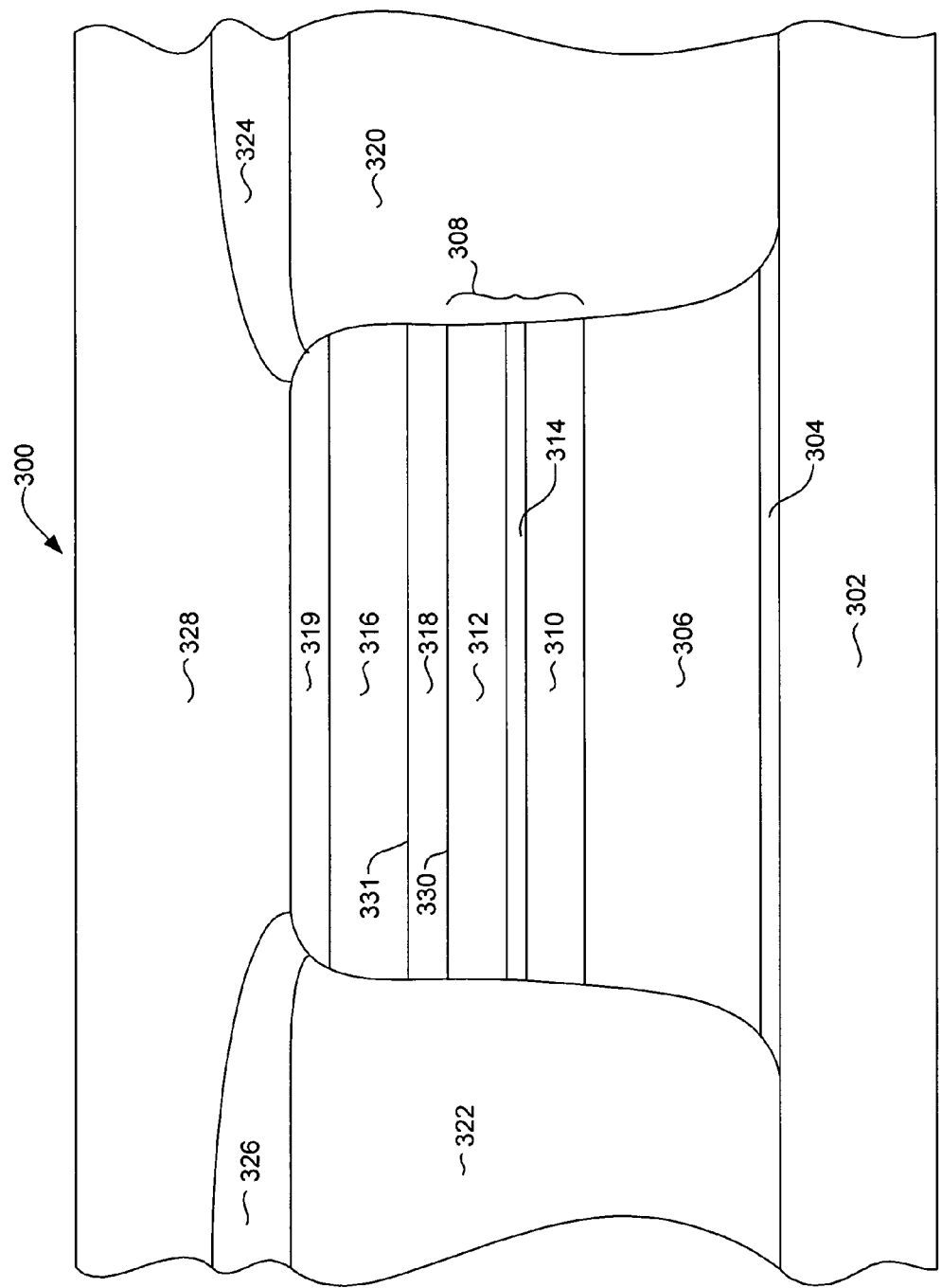
FIG. 3 is an ABS view of a magnetic sensor according to an embodiment of the present invention taken from circle 3 of FIG. 2, shown enlarged and rotated 90 degrees counterclockwise.

With reference now to FIG. 3, a GMR sensor 300 according to a possible embodiment of the invention includes a first gap layer 302 on which a seed layer 304 such as Ta, NiFeCr, NiFe etc. may be deposited. The seed layer 304 initiates a desired crystalline growth in the subsequently deposited layer, which provides improved sensor performance. A layer of antiferromagnetic AFM material 306 may be formed on top of the seed layer.

The sensor 300 also includes a pinned layer 308, which may be an antiparallel coupled pinned layer including a first magnetic layer (AP1) 310 and a second magnetic layer (AP2) 312, which both can be for example Co, CoFe or some other suitable magnetic material. The AP1 and AP2 layers 310, 312 are antiparallel coupled across a thin AP coupling layer 314 which can be for example Ru. The AP1 layer 310 can be exchange coupled with the AFM layer 306, which strongly pins the magnetic moment of the AP1 layer 310. The AP2 layer 312 is then strongly pinned by antiparallel exchange coupling with the strongly pinned AP1 layer 310.

Alternatively, the pinned layer 308 could be self pinned, in which case the pinned layer 308 would be pinned by positive magnetostriction of the materials making up the AP1 and AP2 layers 310, 312 in combination with compressive stresses in the sensor 300. The pinned layer 308 could also be a simple pinned layer having only a single magnetic layer rather than a pair of antiparallel couple layers.

The sensor 300 also includes a magnetic free layer 316, which could be Co, CoFe, NiFe or some combination of one or more layers of these or other possible materials. A non-magnetic, electrically conductive spacer layer 318, such as Cu, is sandwiched between the pinned and free layers 308, 316. Although the free layer 316 could be made of several materials, a layer including Co is preferably disposed adjacent to the spacer layer 318.

The sensor may also include a cap layer, such as Ta 319 formed over the free layer 316 to protect the sensor layers from damage, such as by corrosion during subsequent manufacturing processes. First and second hard magnetic layer (HB layers) 320, 322 may be provided at either side of the sensor to provide biasing to stabilize the magnetic moment of the free layer 316. The HB layers may be for example CoPtCr or some other magnetically hard material. First and second electrically conductive leads 324, 326 are provided at either side of the top of the sensor, 300 to provide sense current for detecting a voltage/resistance change in the sensor. A second gap layer 328 may also be provided to enclose the sensor 300 and insulate it from the write head (not shown) which may be formed above the sensor 300.

According to the present invention, the layers 304-319 of sensor have very smooth interfaces, which serve to significantly improve sensor performance. Similarly, the spacer layer 318 and the free layer 316 meet at an interface 331 that has a very low roughness. These exceedingly smooth interfaces are produced by a method that will be described herein below.

Figure 4A:
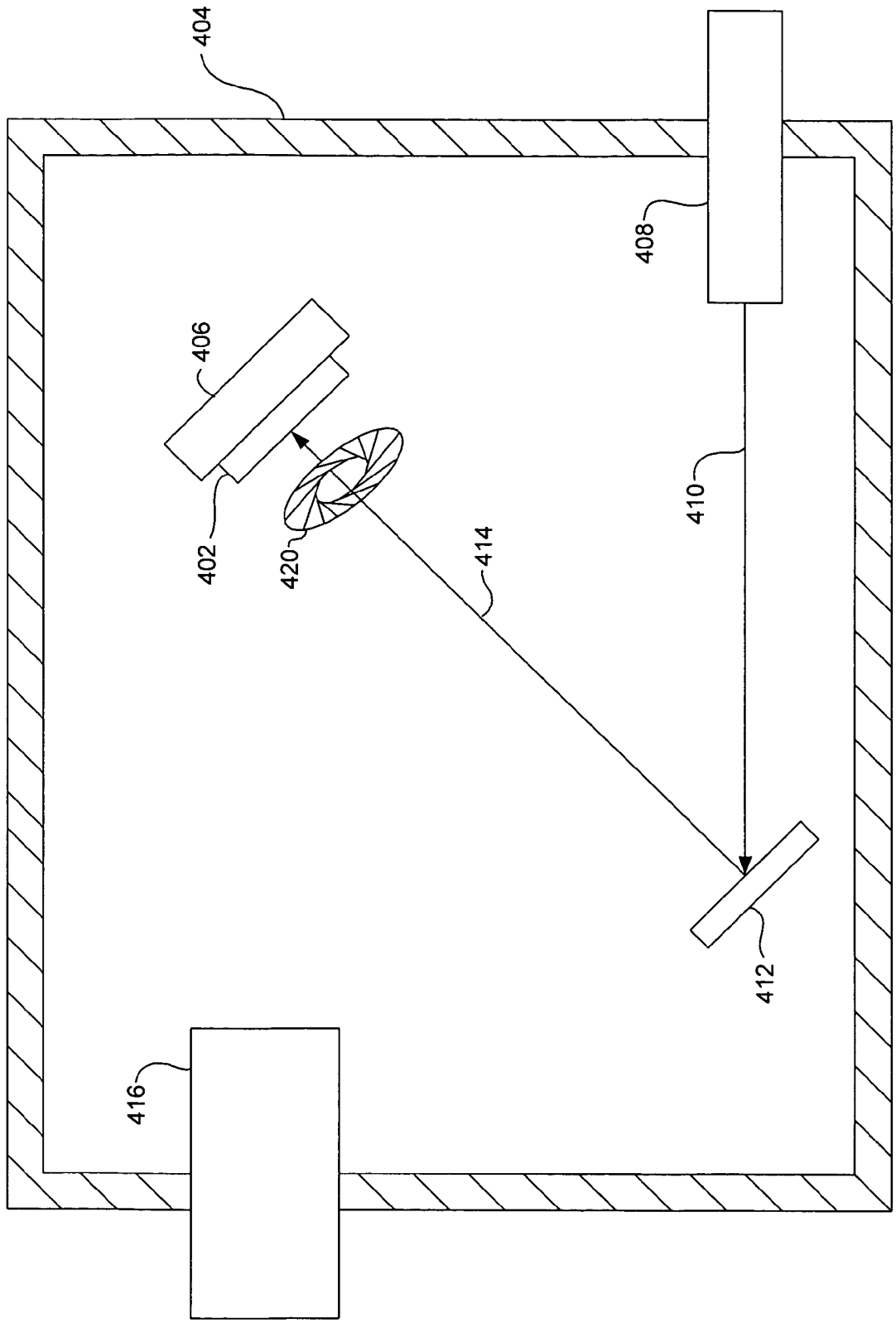
FIGS. 4A and 4B are schematic views of an ion beam deposition chamber for use in manufacturing a GMR sensor according to an embodiment of the present invention.
Figure 4B:
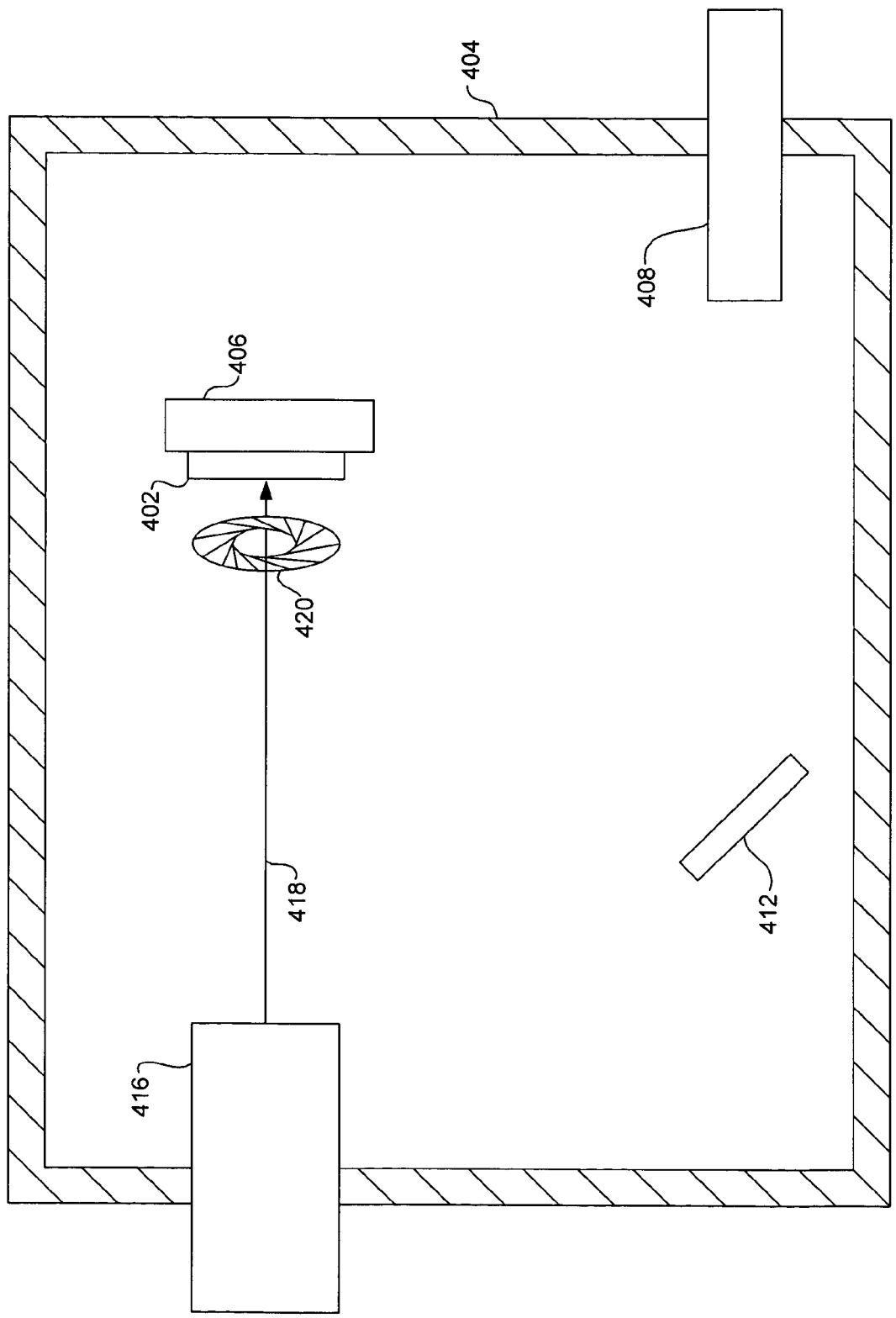

With reference now to FIGS. 4A and 4B. a method for constructing the sensor 300 (FIG. 3) will be described. As those skilled in the art will appreciate, the various layers of the sensor 300 are initially deposited as full film layers, selected portions of which are then removed to form the sensor structure described above. With reference now to FIG. 4A, to construct the full film sensor layers, a wafer 402 is placed in a ion beam deposition vacuum chamber 404. The wafer 402 is held within a chuck 406.

A high energy ion source 408 is provided which may have an energy of for example 500 electron volts (EV). The high energy ion source directs an ion beam 410 at a target 412 that is constructed of a desired deposition material, such as for example CoFe or Cu. The ion beam 410 has an energy above the sputtering threshold of the material making up the target 412. Excitation from the ion beam 410, results in a stream 414 of atoms from the target being emitted toward the wafer 402, where the desired material is deposited onto the wafer 402.

With reference now to FIG. 4B, after a desired first material layer has been deposited, such as for example the material making up the AP2 layer 312 (FIG. 3), a smoothing process is performed. The chuck 406 is rotated so as to face a low energy ion beam source 416. This low energy source 416 emits an ion beam 418 that is below or around the sputtering threshold of the first material. The ion beam 418 preferably has an energy of 100EV or less. The ion beam 418 very effectively smoothes the surface of the deposited material. Any asperities on the surface of the deposited surface will be more readily removed by the ion bombardment than would other lower portions of the surface. In addition, energy from the ion beam 418 excites the atoms on the surface of the wafer 402, allowing the atoms to arrange themselves in a low energy smooth crystalline pattern. Keeping the energy of the low energy ion beam 418 around or below the sputtering threshold of the deposited material on the surface of the wafer 402 prevents sputtering of that material and, therefore, does not result in significant, undesirable removal of the first material layer. The low energy ion beam 418 may be applied for time of about 30 seconds. A shutter 420 may be used to responsively and accurately control the timing of the smoothing processes, thereby improving process control.

After the surface of the first deposited material layer has been smoothed by the low energy ion beam 418, the chuck can be rotated as shown in FIG. 4A and a second material layer can be deposited. The target 412 can be changed to provide a desired second material, such as for example Cu for providing the spacer layer 318 over the AP2 layer 312. The smoothing procedure, provides an exceptionally smooth interface between the first and second material layers.

While the first and second material layers are being described herein as the AP2 layer 312 and spacer layer 318, it should be pointed out that any two layers adjacent of the sensor can benefit from the smoothing procedure using the low energy ion beam 418. For example, the spacer layer 318 could be the first layer and the second layer could be the free layer 316. The low energy ion beam could be applied after deposition of the spacer layer 318, resulting in a smooth interface between the spacer 318 and free layer 316. If the smoothing procedure is performed early in the process, such as to smooth the seed layer 304 or AFM layer 306, the smooth surface will advantageously carry through to subsequently deposited surfaces, resulting in improved smooth interfaces in virtually all of the subsequently deposited materials.

The use of the above described smoothing operation lends itself particularly to use in ion beam deposited wafers, since the low energy ion beam 416, can be located within the same vacuum chamber 404 as the high energy ion beam source 408 used to deposit the various layers onto the wafer. However, this smoothing technique is not limited to ion beam deposited materials, and could also be used to smooth the interfaces of material deposited by other methods, such as by plasma vapor deposition.

Figure 5:
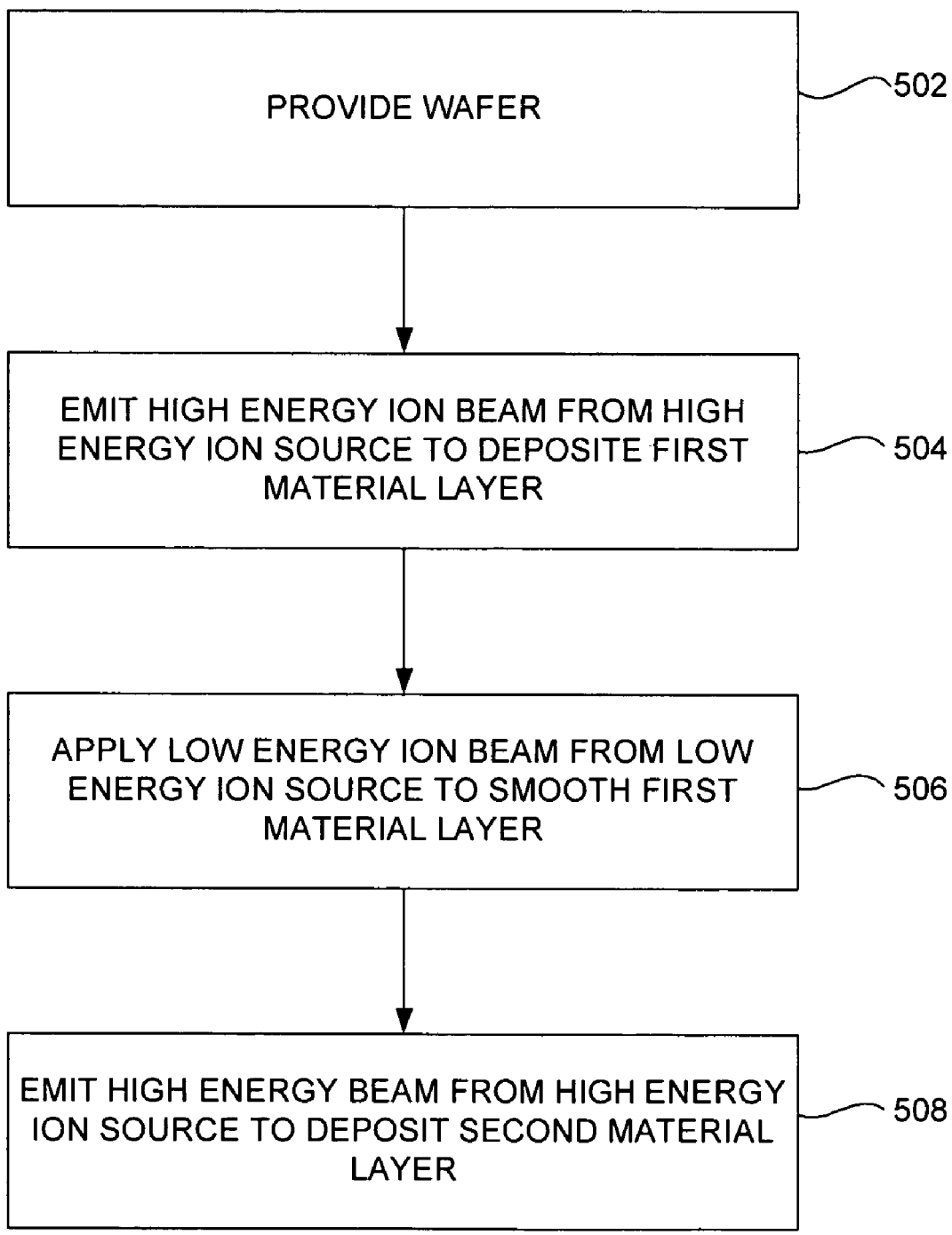
FIG. 5 is a flow chart illustrating a method of manufacturing a magnetoresistive sensor according to an embodiment of the present invention.

With reference to FIG. 5, a smoothing process is summarized as follows. In a step 502 a wafer 402 is provided. The wafer 402 is held on a chuck 406 within an ion beam chamber 404. Then, in a step 504 a high energy ion source 408 is used to deposit a first layer of material onto the wafer 402. In a step 506, the low energy ion beam source is used to apply a low energy beam at the surface of the first deposited layer to smooth the surface of the first layer. Then, in a step 508, the high energy ion beam source is used to deposit a second material layer onto the surface of the first layer.

While various embodiments have been described above, it should be understood that they have been presented by way of example only, and not limitation. For example, while the sensor has been described a GMR sensor it should be pointed out that the sensor could be virtually any type of magnetoresitive sensor, such as a tunnel valve (TMR), and AMR sensor or a current perpendicular to plane (CPP) GMR. Thus, the breadth and scope of a preferred embodiment should not be limited by any of the above-described exemplary embodiments, but should be defined only in accordance with the following claims and their equivalents.

What is claimed is:

1. A method for manufacturing a magnetoresistive sensor, comprising:
    depositing a first layer of magnetoresistive sensor material, the first layer of magnetoresistive sensor material having a horizontally disposed uppermost surface;
    applying a low energy ion beam at the horizontally disposed uppermost surface of the first layer of magnetoresistive sensor material to smoothen the horizontally disposed uppermost surface, the low energy ion beam being at an energy that is below a sputtering threshold of the first layer of the magnetoresistive sensor material so as not to remove a significant portion of the first layer of magnetoresistive sensor material, the sputtering threshold of the first layer of magnetoresistive sensor material being a point at which atoms of the first layer of magnetoresistive sensor material begin to be emitted; and
    after applying the low energy ion beam at the horizontally disposed uppermost surface of the first layer of magnetoresistive sensor material, depositing a second layer of material onto the smoothened horizontally disposed uppermost surface.

2. A method as in claim 1 wherein the low energy ion beam is formed by an ion beam source having an extraction voltage of no greater than 100 electron volts (EV).

3. A method as in claim 1 wherein the first layer of magnetoresistive sensor material is a magnetic layer and the second layer of material is a non-magnetic layer.

4. A method as in claim 1 wherein the first layer of magnetoresistive sensor material is a magnetic pinned layer and the second layer of material is a non-magnetic, electrically conductive spacer layer.

5. A method as in claim 1 wherein the first layer of magnetoresistive sensor material is a non-magnetic layer and the second layer of material is a magnetic layer.

6. A method as in claim 1 wherein the first layer of magnetoresistive sensor material is a non-magnetic, electrically conductive spacer layer and the second layer of material is a magnetic free layer.

7. A method as in claim 1, wherein the first layer of magnetoresistive sensor material and second layer are deposited by ion beam deposition.

8. A method as in claim 1, wherein the low energy ion beam is controlled by a substrate shutter.

9. A method as in claim 1, wherein the low energy ion beam is formed by an ion beam source having an extraction voltage of about 25 electron volts (EV).

10. A method as in claim 1, wherein the low voltage ion beam is applied for a sufficient length of time to substantially smooth a surface of the first layer of magnetoresistive sensor material.

11. A method as in claim 1, wherein the first layer of magnetoresistive sensor material comprises a magnetic material and the second layer of material comprises Cu.

12. A method as in claim 1, wherein the first layer of magnetoresistive sensor material comprises Co and the second layer comprises Cu.

13. A method as in claim 1, wherein the first layer of magnetoresistive sensor material comprises CoFe and the second layer of material comprises Cu.

14. A method as in claim 1, wherein the first layer of magnetoresistive sensor material comprises Cu and the second layer of material comprises Co.

15. A method as in claim 1, wherein the low energy ion beam is applied for a time of about 30 seconds.

* * * * *